UNITED STATES PATENT OFFICE.

ANTONIO PELLETIER, OF WASHINGTON, DISTRICT OF COLUMBIA.

IMPROVED COMPOSITION FOR COATING WOOD, IRON, PAPER, &c.

Specification forming part of Letters Patent No. 71,210, dated November 19, 1867.

*To all whom it may concern:*

Be it known that I, ANTONIO PELLETIER, of Washington, in the District of Columbia, have invented certain new and useful Improvements in Composition for Coating Wood, Cloth, Metals, &c.; and I do hereby declare that the following is a full, clear, and exact description thereof, reference being had to the accompanying drawings making part of this specification and to the letters of reference marked thereon, like letters indicating like parts wherever they occur.

To enable others skilled in the art to construct and use my invention, I will proceed to describe it.

My invention relates to improvements in the composition of matter for which Letters Patent No. 63,087 were granted to me on the 19th day of March, A. D. 1867; and consists principally in the use and addition of new materials for making the composition both fire-proof and water-proof.

While the composition for which my patent was obtained answers most of the purposes for which it was designed, I have found, by further experiments, that it could be materially improved.

My composition as now made, used, and treated with my improvement, I find makes a perfectly fire-proof and water-proof coating for wood or other perishable materials.

In making my composition I take the pulp of any fibrous matter, preferring that from bamboo, sugar-cane, corn-stalks, or other similar substances, prepared as for the making of paper, soap-stone, or any mineral substance of a similar nature, and silicate of soda, in a liquid or any suitable state, in about equal quantities, by weight, and thoroughly mix and incorporate the whole mass until it becomes soft and plastic. To this mixture, when desirable, a small quantity of red lead and litharge, in about equal proportions, may be added, the two together making about one-eighth or one-ninth of the whole mixture.

In order to thoroughly mix and incorporate these materials into a soft and homogeneous mass, any of the ordinary mechanical devices used for such purposes may be employed.

The composition thus made, with or without the red lead and litharge or similar substances, while in its plastic state, I apply, with any suitable instrument, to the surface of any kind of wood, whether green or dry; or to the surface of paper, pasteboard, cloth, leather, brick, stone, or other fibrous or porous materials which I desire to make water and fire proof; or to iron or other metal surfaces that I desire to protect from the action of fire. When this coating is about half dry I treat it with coal or common tar. This tar may be either hot or cold. I prefer to use it hot, as it is then thinner and works easier. This tar may be applied with a brush or any other suitable instrument. Before it becomes dry I cover it with as much powered steatite, talc, or other similar "refractory substance," as it will hold, rubbing it well in with a roller or any suitable instrument. This done the cement will be found completely water and fire proof.

My composition I also make into sheets of any size that may be desired, either for immediate use in the vicinity where made or in convenient size for transportation, having made them fire and water proof, as above described. In this form my composition can be very conveniently used for roofing purposes of all kinds, whether for houses, railroad cars, locomotives, decks of steam-boats, &c., &c., or for covering marine boilers or lining wood or other surfaces exposed to the action of water or fire.

When my composition is applied in its plastic state, I make it of any consistency desired for the purpose for which it is to be used. Most of these purposes are clearly and fully set forth in my Letters Patent No. 63,087 above referred to.

In treating my composition while in a plastic state with steatite, talc, &c., I have found that the chloride of calcium may also be used advantageously, though I prefer the powdered steatite, well rubbed into the tar, as described, and by the term "steatite" I include the entire class of "refractory substances" embraced by it, such as soap-stone, pot-stone, pyrallolite or Rensselaerite, which cover fire-stone, fire-clay, plumbago, mica, &c., or their equivalents, when reduced to a powder or other suitable condition for being incorporated, so as to form a part of my composition when completed.

Having thus described my composition, what I claim is—

1. The compound, consisting of vegetable fiber, silicate of soda, and soap-stone, substantially as described, and for the purposes set forth.

2. The compound, consisting of vegetable fiber, soap-stone, silicate of soda, or its equivalent, when made into sheets, or coated on fibrous, porous, or solid substances, and treated with coal-tar and steatite, substantially as described, and for the purposes set forth.

3. I claim, as a new article of manufacture, the composition, substantially as herein described, and for the uses and purposes set forth.

ANTONIO PELLETIER.

Witnesses:
P. T. DODGE,
H. B. MUNN.